United States Patent
Chen et al.

(10) Patent No.: US 8,582,240 B1
(45) Date of Patent: Nov. 12, 2013

(54) MAGNETIC RECORDING ASSISTED BY SPIN TORQUE OSCILLATOR WITH A RADIO FREQUENCY CURRENT BIAS

(75) Inventors: Wenyu Chen, San Jose, CA (US); Joe Smyth, Aptos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/597,472

(22) Filed: Aug. 29, 2012

(51) Int. Cl.
*G11B 5/127* (2006.01)

(52) U.S. Cl.
USPC ........................................ 360/125.3

(58) Field of Classification Search
USPC .............................. 360/119.04, 125.03, 125.3
See application file for complete search history.

(56) References Cited

U.S. PATENT DOCUMENTS

| 7,724,469 | B2 | 5/2010 | Gao et al. |
| 7,957,098 | B2 | 6/2011 | Yamada et al. |
| 7,982,996 | B2 | 7/2011 | Smith et al. |
| 8,027,110 | B1 | 9/2011 | Yamanaka et al. |
| 8,064,244 | B2 | 11/2011 | Zhang et al. |
| 8,154,825 | B2 | 4/2012 | Takashita et al. |
| 8,300,356 | B2 * | 10/2012 | Zhang et al. ............ 360/119.03 |
| 8,320,080 | B1 * | 11/2012 | Braganca et al. ............ 360/128 |
| 8,467,150 | B2 * | 6/2013 | Takeo et al. ............... 360/125.3 |
| 2008/0112087 | A1 * | 5/2008 | Clinton et al. ................ 360/317 |
| 2011/0211271 | A1 | 9/2011 | Ng et al. |
| 2013/0148229 | A1 * | 6/2013 | Braganca et al. ............... 360/55 |

OTHER PUBLICATIONS

"Microwave Assisted Magnetic Recording," by Jian-Gang Zhu et al., IEEE Transactions on Magnetics, vol. 44, No. 1, Jan. 1, 2008, pp. 125-131.

* cited by examiner

*Primary Examiner* — Angel Castro
(74) *Attorney, Agent, or Firm* — Saile Ackerman LLC; Stephen B. Ackerman

(57) ABSTRACT

A design is disclosed for a microwave assisted magnetic recording device wherein direct current and rf current are simultaneously injected from a bias tee into a spin transfer oscillator (STO) between a main pole and write shield to improve the assist process. The STO oscillation layer (OL) has a large angle magnetization oscillation frequency that is locked to a magnetic medium bit resonance frequency f0 when the rf current has a frequency f=f0 and a threshold current density is applied. Alternatively, the OL magnetization oscillation frequency may be adjusted closer to f0 to improve the assist process. A third advantage is lowering the threshold current density when both direct current and rf current are injected into the STO during a write process. The main pole is grounded when direct current and rf current are injected into a write shield.

11 Claims, 7 Drawing Sheets

MAGNETIC RECORDING ASSISTED BY SPIN TORQUE OSCILLATOR WITH A RADIO FREQUENCY CURRENT BIAS

TECHNICAL FIELD

The present disclosure relates to a design for microwave assisted magnetic recording that involves a bias T to combine dc current and radio frequency current for injection into a spin transfer oscillator formed between a main pole and write shield thereby assisting the writing process while providing for improved device reliability and higher product yield.

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008).

Spin transfer (spin torque) devices are based on a spin-transfer effect that arises from the spin dependent electron transport properties of ferromagnetic-spacer-ferromagnetic multilayers. When a spin-polarized current passes through a magnetic multilayer in a CPP (current perpendicular to plane) configuration, the spin angular moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer if the current density is sufficiently high. Spin transfer devices also known as spintronic devices wherein at least one of the ferromagnetic layers in a magnetoresistive (MR) junction has perpendicular magnetic anisotropy have an advantage over devices based on in-plane anisotropy in that they can satisfy the thermal stability requirement but also have no limit of cell aspect ratio. As a result, spin valve structures based on PMA are capable of scaling for higher packing density which is a key challenge for future MRAM (Magnetoresistive Random Access Memory) applications and other spintronic devices such as microwave generators.

Referring to FIG. 1, a generic MAMR writer based on perpendicular magnetic recording (PMR) is depicted. There is a main pole 1 with a sufficiently large local magnetic field to write the media bit 5 on medium 4. Magnetic flux 8 in the main pole proceeds through the air bearing surface (ABS) 6-6 and into medium bit layer 4 and soft underlayer (SUL) 7. A portion of the flux 8a returns to the write head where it is collected by write shield 2. For a typical MAMR writer, the magnetic field generated by the main pole 1 itself is not strong enough to flip the magnetization of the medium bit in order to accomplish the write process. However, writing becomes possible when assisted by a spin torque oscillator (STO) 3 positioned between the main pole and write shield 2. The STO and medium bit 5 are enlarged in FIG. 1 side (b) and the former is comprised of a high moment magnetic layer 10, and a second magnetic layer 11 that preferably has perpendicular magnetic anisotropy (PMA). Between layers 2 and 10, 10 and 11, and 11 and 1, there are nonmagnetic layers 12, 13, 14, respectively, to prevent strong magnetic coupling between adjacent magnetic layers.

Assuming a medium bit 5 with a magnetization in the direction of 9 (pointing up) is being written by a flux field 8 pointing down as in FIG. 1 side (a), part of the magnetic flux 8b goes across the gap between main pole 1 and write shield 2, and this weak magnetic field can align the magnetization of layer 11 perpendicular to the film surface from left to right. An external current source 18 creates a bias current across the main pole and write shield. The applied dc results in a current flow in a direction from the write shield through the STO 3 and into main pole 1.

Referring to FIG. 2a, the direct current generated by source 18 is spin polarized by magnetic layer 11, interacts with magnetic layer 10, and produces a spin transfer torque $\tau_s$ 23 on layer 10. Spin transfer torque has a value of $a_j$ m×m×$m_p$, where $a_j$ is a parameter proportional to the current density j, m is the unit vector 15 in the direction of the instantaneous magnetization for layer 10, and $m_p$ is the unit vector 16 in the direction of magnetization in layer 11. Spin transfer torque $\tau_s$ 23 has a representation similar to the damping torque $\tau_D$ 24, and with a specific current direction, $\tau_s$ 23 competes with $\tau_D$ 24, so that the precession angle 50 is from about 0 to 10 degrees. Only when the current density is above a critical value $j_c$ will $\tau_s$ 23 be large enough to widely open the precession angle of magnetization 15 in layer 10 such that the oscillation has a large angle 51 usually between 60° and 160° as indicated in FIG. 2b. The large angle oscillatory magnetization of layer 10 generates a radio frequency (rf) usually with a magnitude of several to tens of GHz. This rf field interacts with the magnetization 9 of medium bit 5 and makes magnetization 9 oscillate into a precessional state 17 (FIG. 1 side b) thereby reducing the coercive field of medium bit 5 so that it can be switched by the main pole field 8.

Thus, magnetic layer 11 is often called a spin polarizer (SP) and magnetic layer 10 is referred to as the oscillation layer (OL). The aforementioned oscillation state is also achieved if main pole field 8 and medium magnetization 9 are in the opposite directions to those shown in FIG. 1. In this case, the direction of the SP magnetization 16 will be reversed, and OL as well as the medium bit will precess in the opposite direction with respect to the illustration in FIG. 1 side b.

Current MAMR technology has three main drawbacks. First, the threshold current density $j_c$ required for OL 10 to oscillate is quite high on the order of $10^7$ to $10^8$ A/cm². As a result, there is a reliability concern for STO 3 since such a high current density in addition to generated heat causes electrical migration and interlayer diffusion that may damage the STO device. Secondly, the oscillation frequency of OL 10 is not easily tuned and the field across main pole 1 and write shield 2 cannot be tuned in a HDD product. Furthermore, small defects in geometry and/or material of STO layers results in an oscillation frequency shift of OL 10. If the oscillation frequency of OL 10 does not match the ferromagnetic resonance frequency of medium bit 5, the so-called microwave frequency assist will be less effective and MAMR performance will suffer. Thirdly, oscillation amplitude of OL 10 may be lower than expected due to defects and/or an extrinsic damping mechanism caused by magnetic coupling with main pole 1 or write shield 2, for example. As a result, the rf field amplitude generated by OL 10 may not be large enough to assist the recording process in some cases. Therefore, all of the aforementioned issues must be addressed in order to optimize MAMR and advance the technology to a level where it is acceptable from a manufacturing view point as well as from a performance and reliability perspective.

SUMMARY

One objective of the present disclosure is to reduce the current threshold ($j_c$) that drives an oscillation layer in a STO device into an oscillation mode.

A second objective of the present disclosure is to lock the oscillation layer's oscillation frequency in a STO device to a certain value that matches the resonance frequency of a medium bit and where the oscillation frequency has a sufficient magnitude to cause the medium bit to oscillate.

A third objective of the present disclosure is to provide a MAMR design that provides for a higher rf field amplitude from the oscillation layer in the STO device thereby enabling a stronger assist to a write process and yielding a more robust STO that is more forgiving to variations in magnetic properties and internal defects.

Another objective of the present disclosure is to accomplish the first three objectives without building a more complicated write head structure but rather with a modified circuit design with connections to main pole and write shield terminals.

According to one embodiment of the present invention, these objectives are achieved with a MAMR design having a STO device formed between a main pole and a write shield and wherein the leads from the main pole and write shield are connected to a bias T that combines a direct current (dc) component from a current source and an ac component from a rf current generator. One terminal of the rf current generator is grounded but the main pole and write shield are electrically floating. The dc terminal of the bias T is an inductor with a typical inductance of 0.1 to 10 milli-Henry. For any current including dc with a frequency below a kHz regime, the impedance of the inductor is smaller than 10 Ohm so that dc and a low frequency signal can pass. However, for any current in the GHz regime, the impedance of the inductor is on the order of a mega Ohm or greater and the rf signal is blocked. The rf terminal of the bias T is a capacitor, preferably in the 1 nanofarad to 500 nanofarad regime. GHz frequency can pass with low impedance while low frequency current including dc is blocked with high impedance. In this way, both dc current and rf current are injected into the STO through the write shield terminal.

In one aspect, the STO has stack of layers wherein a first non-magnetic layer (NM1) contacts the main pole and a second non-magnetic layer (NM2) contacts the write shield. There is a third non-magnetic layer (NM3) formed between a spin polarization (SP) layer and an oscillation layer (OL). The STO stack may have a NM1/SP/NM3/OL/NM2 configuration as in the first through fourth embodiments or a NM1/OL/NM3/SP/NM2 configuration in fifth through eighth embodiments. Preferably, the SP layer has perpendicular magnetic anisotropy (PMA).

In the absence of the rf current, spin polarized current in the SP layer generates a dc $\tau_s$ with a constant $a_j$. When rf current is added simultaneously with dc by injection into a main pole or write shield terminal, $a_j$ becomes a function of time since total current density is a function of time. In one embodiment where the frequency (f1) at which the OL naturally oscillates is within about 20% of the medium bit resonance frequency (f0), the OL oscillation frequency is tuned to f1' and locked to the f0 frequency by injecting a rf current with frequency f=f0 simultaneously with dc from the bias T into the STO. As a result, f1' is locked to f0 of the magnetic medium bit being written to which improves the efficiency of the assist from a large angle OL oscillation state on the writing process.

According to another embodiment, when the OL oscillation frequency f1 is substantially different from the medium bit resonance frequency f0, then the OL frequency is not locked but is adjusted or pulled toward frequency f0 by applying a rf current with frequency f=f0 in combination with dc across the STO. This adjustment or tuning of OL magnetization oscillation frequency to f1' is not as powerful as in the aforementioned "locked" mode embodiment but is valuable when the OL magnetization frequency f1 is outside a range of about 0.8 f0 to 1.2 f0. By pulling the OL oscillation frequency closer to the medium bit oscillation frequency, the "assist" during a writing process is more efficient.

When both dc current and rf current are injected into the STO as previously mentioned, critical current is reduced. In an example where there is a gap field H3 and a dc current density of $1.2 \times 10^8$ A/cm$^2$, OL magnetization is not driven into a large angle oscillation state. The in-plane small angle precession has a small peak around 10 GHz. With the same gap field, the dc current may be lowered to $0.4 \times 10^8$ A/cm$^2$ while adding a 10 GHz rf current with a rms amplitude of $0.3 \times 10^8$ A/cm$^2$ to successfully achieve large angle oscillation in OL magnetization. Thus, the critical current needed to drive OL magnetization into oscillation can be significantly lowered by applying a rf current having a sufficient rms amplitude and a frequency within about 20% of the OL magnetization precessional frequency.

In a second embodiment, the features of the first embodiment are retained except the main pole shares the same electrical ground as the rf current source.

A third embodiment has the same features as the first embodiment except the combination of dc current and rf current from the bias T is injected into the main pole terminal rather than into the write shield terminal.

In a fourth embodiment, all the features of the third embodiment are retained except the write shield is grounded and shares the same electrical ground as the rf current source.

According to a fifth embodiment, all features of the first embodiment are retained except the STO has a NM1/OL/NM3/SP/NM2 configuration. The polarity of the dc current bias should also switch sign.

A sixth embodiment has all the features of the second embodiment except the STO now has a NM1/OL/NM3/SP/NM2 configuration and the polarity of the dc current bias switches sign.

The seventh embodiment has the same features as the third embodiment except the STO now has a NM1/OL/NM3/SP/NM2 configuration and the polarity of the dc current bias switches sign.

The eighth embodiment is the same as the fourth embodiment except the STO now has a NM1/OL/NM3/SP/NM2 configuration and the polarity of the dc current bias switches sign.

According to a ninth embodiment, the dc and rf current are injected directly into the STO with the SP layer serving as one terminal, and the OL serving as a second terminal.

DETAILED DESCRIPTION

The present disclosure is a MAMR structure comprising a spin transfer oscillator (STO) formed between a main pole and a write shield in a write head, and a circuit design that has connections to the main pole and write shield, or directly to the STO. A combination of dc and rf current is injected into a main pole terminal, a write shield terminal, or into the STO itself to improve device performance in terms of a lower critical current $j_c$, and locking the OL magnetization frequency in the STO to the medium bit resonance frequency, or adjusting the OL magnetization frequency to a value that more closely matches the medium bit resonance frequency. A main pole terminal and write shield terminal are understood to be locations where a lead (wire) from an electrical source is attached to the main pole and write shield, respectively. A bias tee (abbreviated as bias T herein) is a three port network that has input from a dc source and from a rf current source, and output that is a combination of dc and rf current.

Figure 3:
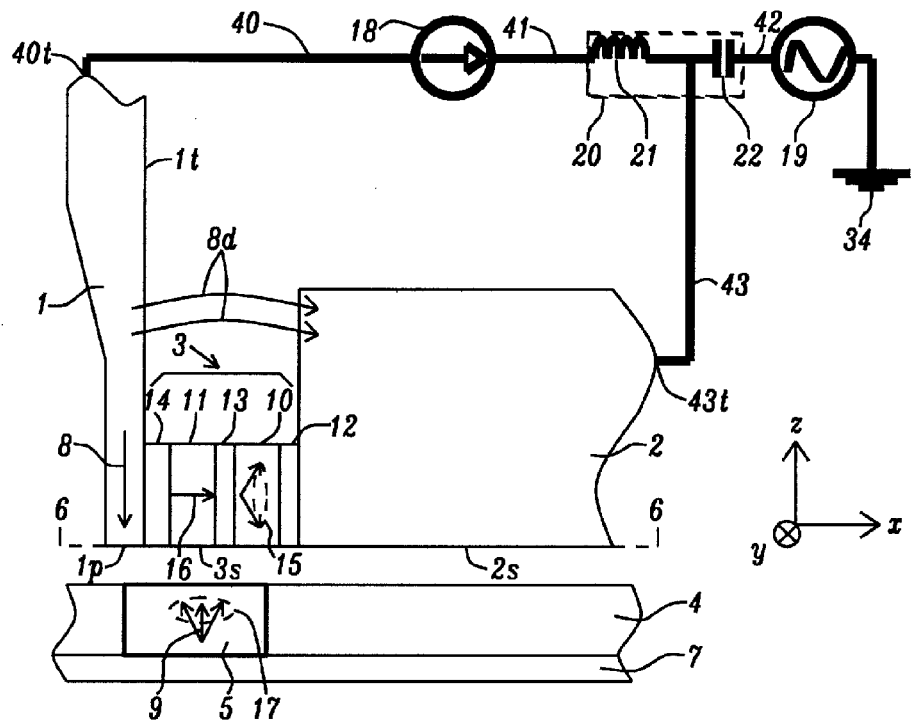
FIG. 3 depicts a MAMR structure according to a first embodiment of the present disclosure wherein a STO is formed between a main pole (MP) and write shield (WS), and a bias T is used to inject a combination of direct current and rf current into the STO through a write shield terminal to assist a write process.

Referring to FIG. 3, a first embodiment of the present disclosure is illustrated and comprises a STO 3 having a bottom surface contacting a main pole layer 1 and a top surface contacting a write shield 2 in a MAMR structure. The x-axis is the medium moving direction also known as the down-track direction and the y-axis represents a cross-track direction. During a write process, magnetic flux 8 passes through the ABS 6-6 and transits the magnetic medium 4 and soft underlayer 7 and re-enters the write head through the write shield 2 as previously indicated with regard to FIG. 1. The magnetic flux in the magnetic medium and write shield is not shown here to simplify the drawing. The main pole has a pole tip 1p at the ABS and the write shield has a side 2s along the ABS. Moreover, STO 3 has a sidewall 3s formed along the ABS. The STO has a first non-magnetic layer NM1 14 that serves as a seed layer and interfaces with the main pole, a second non-magnetic layer NM2 12 that interfaces with the write shield, and a third non-magnetic layer NM3 13 formed between a magnetic layer 11(SP layer with PMA), and an oscillation layer (OL) 10. Non-magnetic layers 12 and 14 may be multilayer films as appreciated by those skilled in the art. PMA layer 11 may be a laminated stack of layers such as $(Co/Ni)_n$, $(Co/Pt)_n$, $(Co/Pd)_n$, or $(Fe/V)_n$, for example, where n is a lamination number. The PMA layer may further comprise a transition layer made of a ferromagnetic material such as CoFe or Co as the uppermost layer that interfaces with the NM3 layer. In one aspect, OL 10 is made of CoFeB or a combination of CoFeB and CoFe, or even laminated magnetic layers, although other magnetic materials are acceptable. In the exemplary embodiment, STO 3 has stack of layers with a NM1/SP/NM3/OL/NM2 configuration where NM2 is considered a cap layer. STO layers mentioned above have planes that are aligned parallel to the y-z plane.

A key feature is the circuit design for applying a bias current across the main pole 1 and write shield 2. In a preferred embodiment, a bias T 20 is used to combine direct current (dc) from a dc source 18 and rf current with a frequency f from 0.1 to 50 GHz from a rf current generator 19, and inject the current into the write shield at terminal 43t through a lead 43. As explained in alternative embodiments in a later section, dc and rf current may be injected into the main pole terminal rather than into a write shield terminal. Note that the dc source 18 is connected by lead 40 to the main pole at terminal 40t and is also connected to the bias T 20 by lead 41. The dc terminal of the bias T is an inductor 21 with a typical inductance of 0.1 to 10 milli-Henry. For any current including dc with a frequency below the kHz regime, the impedance of the inductor is smaller than 100 Ohm so that dc and low frequency signal can pass. However, for a current with a frequency in the GHz regime, the impedance of the inductor 21 is greater than sub-MegaOhm which blocks the rf signal.

The bias T 20 has a rf terminal 22 that is a capacitor, preferably in the 1 nanofarad to 500 nanofarad regime. The rf terminal 22 is connected to rf generator 19 by a lead 42. Thus, GHz frequency may pass with low impedance while low frequency current including dc is blocked with high impedance. In this way, both dc and rf current are injected from the bias T into STO 3 through lead 43 and write shield terminal 43t. Note that one terminal of the rf generator 19 is connected to ground 34. However, the main pole and write shield are electrically floating.

When dc and rf current are simultaneously injected into write shield 2 and flow through STO 3 in a current perpendicular to plane (CPP) mode to main pole 1, the dc and rf current is spin polarized by SP layer 11 and generates a spin transfer torque on OL 10 thereby leading to a large angle oscillation of OL magnetization 15 with a certain amplitude and frequency. Note that the frequency f1 at which OL 10 naturally oscillates may be tuned to a value f1' when the rf current frequency f equals the resonance frequency f0 for magnetization 9 in medium bit 5. In one aspect where f1 is within about 20% of the value for f0, f1' is locked to frequency f0. Alternatively, when f1 is outside a range of 0.8 f0 to 1.2 f0, f1' is not locked to f0 but is "pulled" toward f0 such that the difference (f1'-f0) is smaller than (f1f0). As a result, the injection of rf current is responsible for one or more beneficial effects including OL magnetization frequency locking, frequency pulling and mixing, and reduced critical current which are explained in detail below. The rms amplitude of rf current is preferably between 0.2 and $5 \times 10^8$ A/cm$^2$.

Figure 2A:
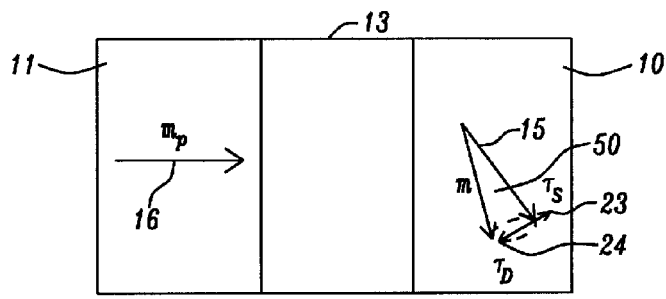
FIG. 2a is a cross-sectional view of the spin polarization (SP) and oscillation layer (OL) in the STO in FIG. 1 and depicts a small precession angle in the OL magnetization.
Figure 2B:
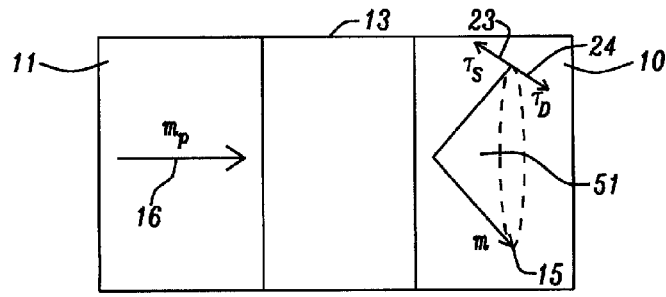
FIG. 2b is a cross-sectional view of the SP layer and OL in FIG. 1 when the critical current density in the STO is above a threshold value that causes the OL magnetization to achieve a large precession angle.

Under a specific gap field 8d with magnitude H1 of 3600 Oe, for example, and a dc bias I1 of 3 mA ($1.2 \times 10^8$ A/cm$^2$ in current density), OL magnetization 15 is excited into a precessional state with a large angle similar to angle 51 in FIG. 2b. A simulation of OL magnetization in the y (cross-track) direction is shown as a function of time in FIG. 4a. The solid line 24 is the y direction magnetization as a function of time for the condition where only dc current bias I1 and gap field H1 are applied across STO 3. The corresponding Fourier transform 26 is depicted in FIG. 4b and has a main oscillation frequency near 10.7 GHz. If a 10 GHz rf current=f0 is applied to STO 3 with a rms amplitude of $0.56 \times 10^8$ A/cm$^2$-according to an embodiment of the present disclosure, OL magnetization dynamics as a function of time is slightly slower as indicated by the dashed line 25 in FIG. 4a. Furthermore, the corresponding Fourier transform with dynamics peak 27 in FIG. 4b clearly shows that frequency locking occurs by tuning the OL oscillation magnetization frequency from f1=10.7 GHz to f1' at 10 GHz. In other words, the dynamics frequency of OL magnetization oscillation is locked to the rf current frequency and frequency f0 at about 10 GHz. The linewidth of the dynamics peak 27 is also sharper with a slightly higher amplitude than dynamics peak 26 which is consistent with the appearance of dashed line 25 (vs. line 24) in FIG. 4a.

Figure 4A:
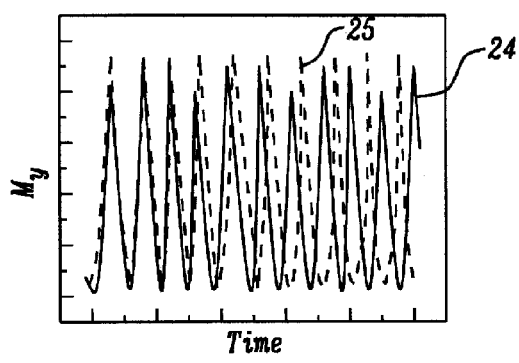
FIG. 4a is a simulated plot of OL magnetization in a cross-track direction as a function of time for conditions where a direct current (solid line), and a combination of dc and rf current (dashed line) is injected into a STO between a MP and WS.
Figure 4B:
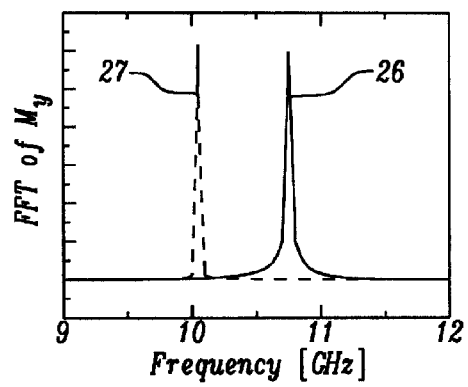
FIG. 4b shows a Fourier transform plot of the data in FIG. 4a and indicates that a combination of dc and rf current injected into a STO results in a frequency locking of the OL magnetization oscillation.

The results shown in FIGS. 4a, 4b demonstrate that large angle precessional frequency in OL 10 may be adjusted by simultaneously applying dc and rf current across STO 3 so that there is a rf current bias as well as a dc current bias affecting OL magnetization. The capability to adjust or tune the OL magnetization oscillation frequency (f1) is an advantage over prior art during actual MAMR recording because f1 can slightly mismatch the medium bit magnetization (resonance) frequency (f0) due to geometry effects or defects in the MAMR structure. We have found that one can apply a rf current as indicated above at a frequency f=f0 such that OL magnetization 15 precesses at a tuned frequency f1' equal to f0 and with larger amplitude and a narrower linewidth than frequency f1 where f1 occurs in an OL oscillation state established by applying only dc current as in conventional MAMR technology. The strength of the lock signal may be tuned by adjusting the rms amplitude of the rf current in a range between 0.2 and $5 \times 10^8$ A/cm$^2$ where a higher amplitude means a stronger lock signal. The aforementioned range typically applies to a GMR configuration where NM2 is a metal spacer. In an embodiment where NM2 is an oxide layer and STO comprises a tunnel junction configuration, then the critical rms amplitude may be as low as $10^6$ A/cm$^2$. It should be understood that rms amplitude of rf current is typically kept below an upper limit mentioned above to avoid excess heating that results in electromigration, and to reduce the likelihood of resonance nonlinearity that includes phenomena such as resonance frequency shift, a sharp jump in resonance lines, and hysteresis in resonance lines.

Figure 5:
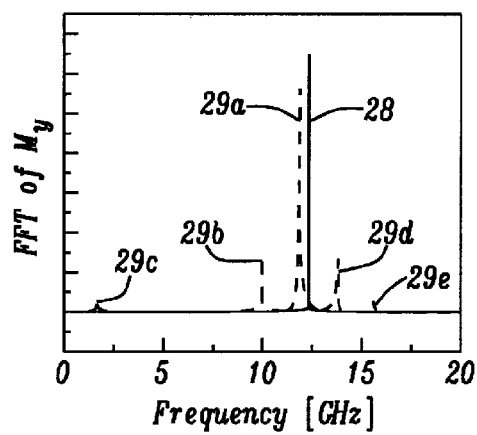
FIG. 5 shows a Fourier transform plot of a condition where rf frequency is applied to a STO at a frequency substantially below that of the OL magnetization frequency to adjust the OL magnetization frequency to a value that more closely matches the medium bit oscillation frequency thereby improving the strength of the MAMR assist.

Referring to FIG. 5, a second advantage of the present disclosure is the capability to provide OL magnetization frequency pulling and mixing. Under a specific gap field H2 of 2400 Oe, for example, and a dc bias I2 of 3 mA ($1.2 \times 10^8$ A/cm$^2$ in current density) across a STO, large angle oscillation of OL magnetization 15 at f1 (close to 12.2 GHz in this example), is depicted by dynamics peak 28 in the Fourier transform. When a rf current at a frequency f=10 GHz=f0 is applied simultaneously with the aforementioned dc according to an embodiment of the present disclosure, the simulated result in FIG. 5 reveals that the frequency of OL magnetization oscillation 15 is lowered slightly from f1 toward f and f0, and ends up at f1' that is a frequency near peak 29a. Note that frequency locking does not occur as in the previous example since f1 at 12.2 GHz is substantially farther from f0 (and f) at 10 GHz than f1=10.7 GHz for the naturally occurring OL oscillation frequency in FIGS. 4a, 4b. In general, when f1 is outside a range of 0.8 f0 to 1.2 f0, then frequency locking of OL magnetization oscillation to f0 is difficult to achieve. Furthermore, there exists a second strong peak 29b at the frequency f, and three additional peaks 29c, 29d, 29e at the frequencies of f1'-f, 2f1'-f, and 3f1'-2f, respectively, which create beats in the oscillation signal. Thus, f1' is actually the sum of the (amplitude×frequency) values for the five peaks 29a-29e divided by five. In this case, f1' is slightly less than the frequency for the large center peak 29a since peaks 29b, 29c that pull f1' lower have a higher amplitude and therefore a larger contribution to the tuning of frequency f1 than peaks 29d, 29e that pull f1' in the opposite direction to higher frequency.

The results depicted in FIG. 5 demonstrate than under conditions where the naturally occurring OL magnetization frequency 11 is more than about 20% different in magnitude than the medium bit magnetization oscillation frequency f0, one can still apply rf current with a frequency f=f0 to adjust OL magnetization frequency closer to f0 to make the writing assist more efficient. There will also be oscillation components at f and at other mixing frequencies that create beats and contribute to the net shift from f1 to f1'. Although the simultaneous injection of dc and rf current in this example improves writing assist performance, optimization does not occur to the same extent as provided in the previous example where frequency locking is established. In order to achieve frequency locking for a condition represented in FIG. 5, or exert a greater pull toward frequency f0, one may increase the rf current amplitude, for example.

Figure 6:
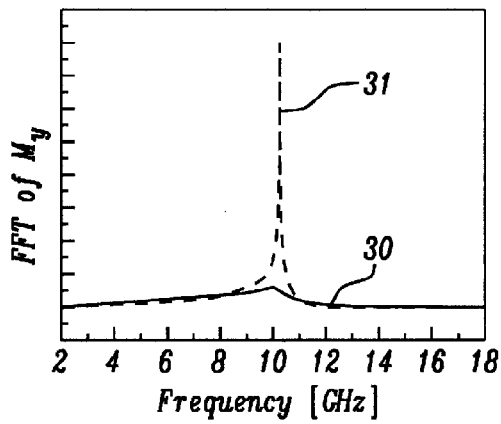
FIG. 6 is a Fourier transfer plot demonstrating that the combination of rf current and dc current injected into a STO enables a lower critical current density to achieve OL magnetization oscillation.

Referring to FIG. 6, a third advantage of the simultaneous application of dc and rf current across a STO according to an embodiment of the present disclosure is the reduction of critical (threshold) current density. In an example where there is a specific gap field H3 of 5200 Oe and a direct current density of $1.2 \times 10^8$ A/cm$^2$, solid line 30 in the Fourier transform shows that OL magnetization 15 is not driven into a large angle oscillation state since the signal is very weak. The in-plane small angle precession similar to angle 50 in FIG. 2a has a small peak near 10 GHz. With the same gap field, a reduction in direct current density to $0.4 \times 10^8$ A/cm$^2$, and simultaneous injection of a 10 GHz rf current with an rms amplitude of $0.3 \times 10^8$ A/cm$^2$, the OL magnetization is driven into a large angle oscillation as shown by the dashed line with peak 31. The rms amplitude of the injected rf current may be adjusted above or below $0.3 \times 10^8$ A/cm$^2$ to further tune the critical current value. Here we demonstrate that the critical current to drive OL magnetization into large angle oscillation may be significantly reduced by applying a rf current with a frequency f that is close to the OL magnetization natural precessional frequency f1. As a result, STO reliability is now in a safer regime with a lesser concern about electromigration and interlayer diffusion that are typically associated with a high current bias in conventional MAMR technology.

Figure 1:
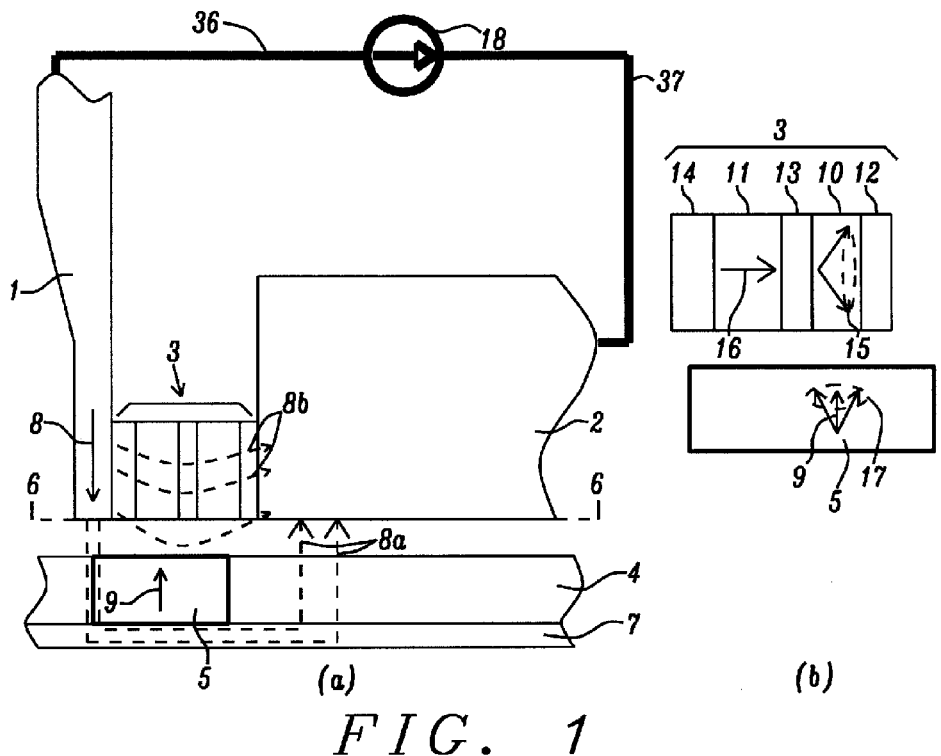
FIG. 1 is a cross-sectional view of a conventional MAMR structure with a STO formed between a main pole and write shield wherein an external direct current source creates a bias current across the main pole and write shield.
Figure 7:
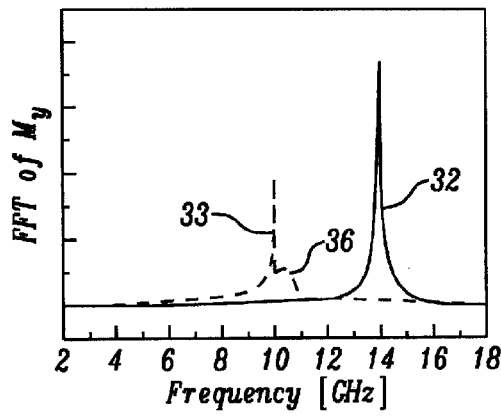
FIG. 7 is a Fourier transform plot that shows the effect of frequency locking to an OL small angle precessional frequency when rf current is injected with a dc current into a STO and the rf current frequency is closer to the OL small angle precessional frequency than the large angle precessional frequency of an OL oscillation mode.

Under certain conditions, the application of rf current may make OL magnetization 15 more difficult to oscillate with a large angle precession. As illustrated in the example depicted in FIG. 7, there is an oscillation peak 32 generated with a gap field H4 of 6000 Oe and dc bias I4=4 mA ($1.6 \times 10^8$ A/cm$^2$ in current density) in the absence of rf current. A large angle precession peak 32 is close to 14 GHz and an in-plane small angle precession peak 36 is approximately 10.5 GHz. If a rf current with frequency f=10 GHz is applied with an rms amplitude of 1.4 mA ($0.56 \times 10^8$ A/cm$^2$ in current density) where f is closer to the OL in-plane precession mode frequency (10.5 GHz) than the large angle precession frequency (14 GHz), then one can lock the OL magnetization dynamics within the in-plane precession mode as represented by peak 33. This condition means that a sufficiently large rf field amplitude cannot be delivered to the medium bit to assist the writing process. Of course, this effect is seldom used since the primary objective is to make the writing assist easier to accomplish. However, this method of locking to a small angle in-plane precession mode is beneficial in reducing return field partial erasure (RFPE). As shown in FIG. 1, the magnetic field in proximity to write shield 2 is called the return field 8a and is in the opposite direction to field 8 in the main pole 1. Although the magnitude of the return field is much weaker than field 8, the return field is capable of erasing a written bit. When OL magnetization is locked into the small angle in-plane precession mode as explained above, the chance of erasing a written bit with the return field is substantially reduced. The locking strength may be adjusted by varying the rms amplitude of the injected rf current.

In FIGS. 8-15, additional embodiments of the present disclosure are described. It should be understood that the alternative embodiments share all of the advantages previously associated with the first embodiment. In particular, the simultaneous application of dc and rf current across a STO in a MAMR structure enables the beneficial effects of OL magnetization frequency locking, OL magnetization frequency pulling and mixing, and reduced critical current. Furthermore, frequency locking to an OL in-plane precessional mode may be realized to reduce the likelihood of the return field causing bit erasure. Preferably, the rf current applied to the STO has a frequency from 0.1 to 50 GHz.

Figure 8:
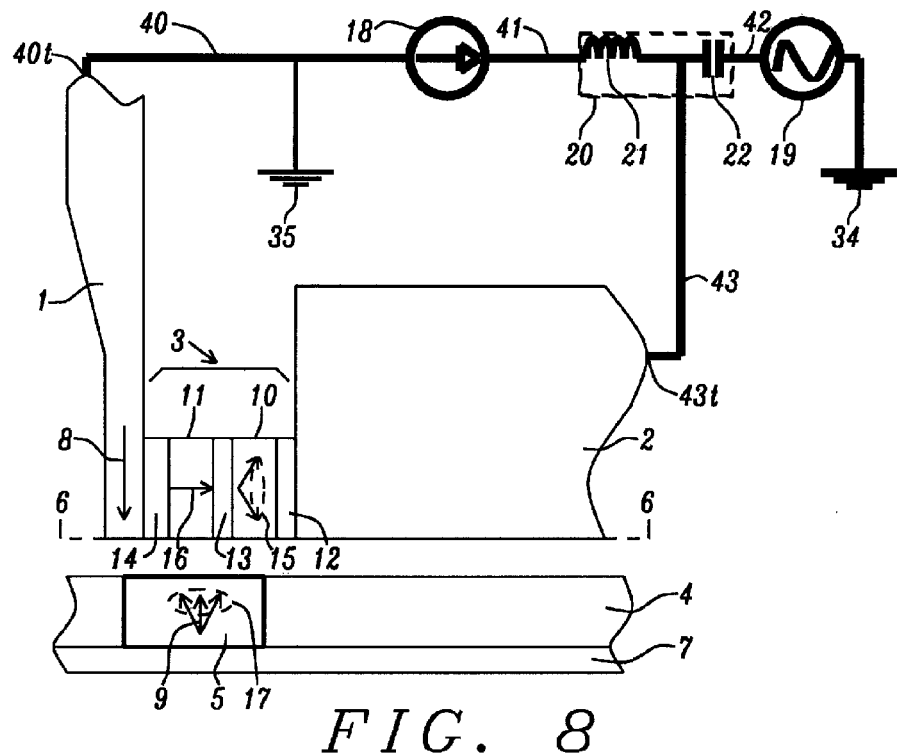
FIG. 8 is a cross-sectional view of MAMR structure according to a second embodiment of the present disclosure wherein dc and rf current are injected from a bias T into a STO through a write shield terminal, and the main pole and rf frequency source are both grounded.

Referring to FIG. 8, a second embodiment is depicted wherein all the features of the first embodiment in FIG. 3 are retained, and an additional aspect is introduced wherein the main pole terminal 40t shares a common ground with the ground of the rf current source 19. According to one embodiment, the lead 40 that connects the main pole terminal 40t to the dc current generator 18 is connected to ground 35, and the rf current source is connected to ground 34.

Figure 9:
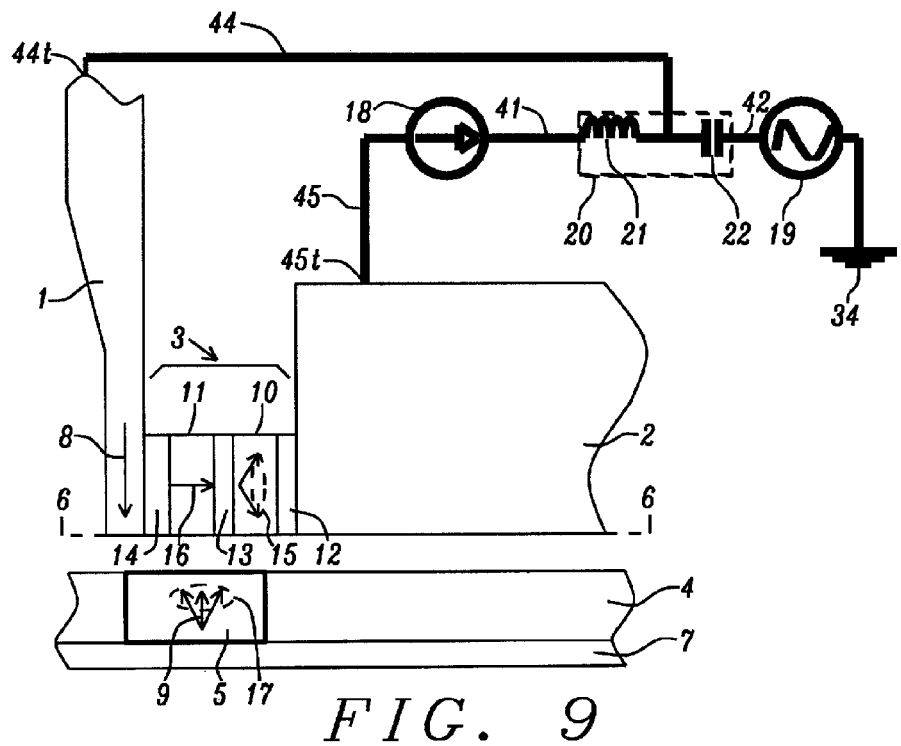
FIG. 9 is a cross-sectional view of a MAMR structure according to third embodiment of the present disclosure wherein dc and rf current are injected from a bias T into a STO through a main pole terminal to assist a write process.

Referring to FIG. 9, a third embodiment is illustrated wherein the features of the first embodiment are retained except that the combination of dc and rf current is injected into main pole terminal 44t through lead 44 that is connected to the bias T 20. Rf generator 19 is attached to the bias T 20 at rf terminal 22 as previously described, and one terminal is also connected to ground 34. DC generator 18 is connected to a write shield terminal 45t through lead 45 and to the bias T at dc terminal 21 by lead 41. Note that the flow of direct current is in an opposite direction to that depicted in FIG. 3 which means dc and rf current are injected into the main pole rather than into the write shield. Therefore, the dc bias switches sign with respect to the first embodiment. Main pole 1 and write shield 2 are electrically floating in this MAMR structure.

Figure 10:
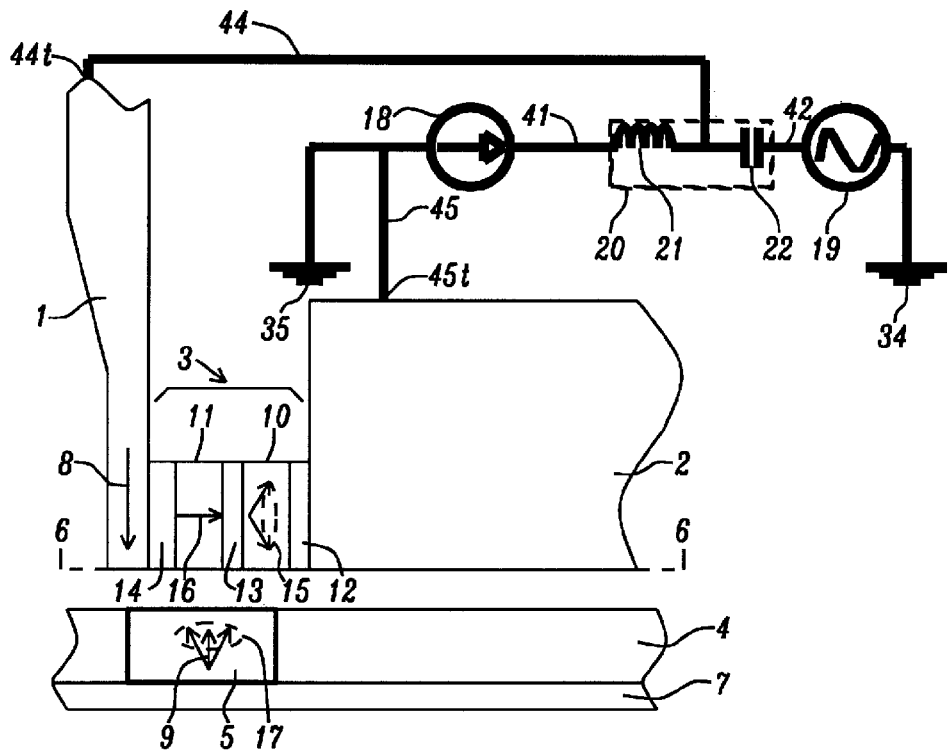
FIG. 10 is a cross-sectional view of a MAMR structure according to a fourth embodiment of the present disclosure wherein the MAMR design in FIG. 9 is further comprised of connecting the write shield to a ground.

Referring to FIG. 10, a fourth embodiment is depicted that is the same as the third embodiment except the write shield 2 is connected to ground 35 and thus shares the same electrical ground 34 as one terminal of the rf current source 19. In this embodiment, the lead 45 that connects write shield terminal 45t to dc generator 18 is also connected to ground 35.

Figure 11:
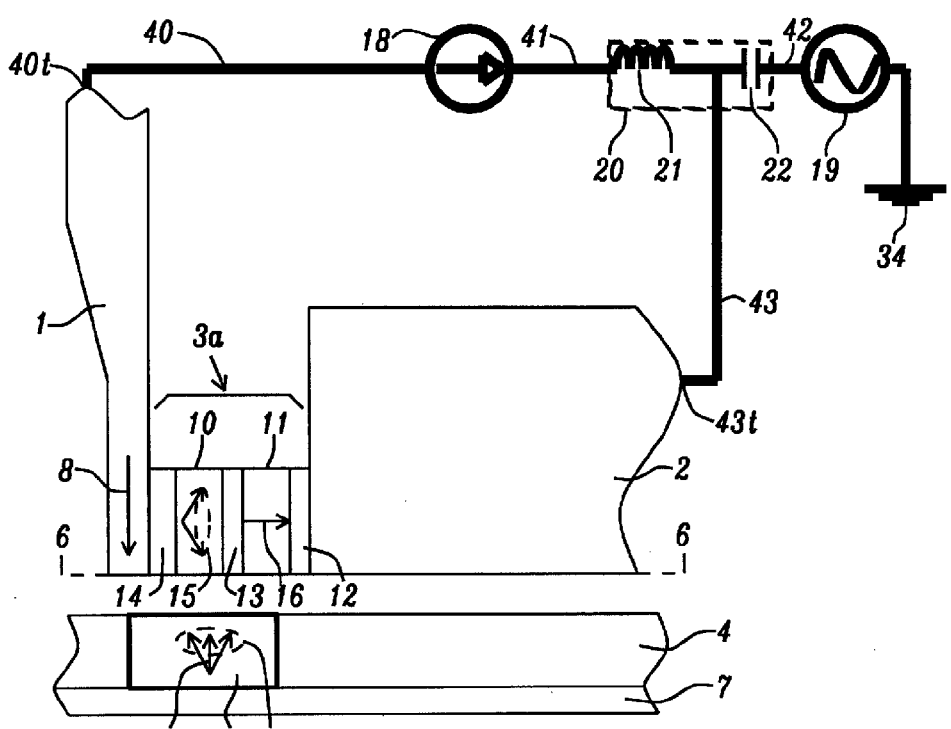
FIG. 11 is a cross-sectional view of a MAMR structure according to a fifth embodiment of the present disclosure wherein the positions of the OL and SP layer in the STO of the first embodiment (FIG. 3) are switched.

Referring to FIG. 11, a fifth embodiment is shown that retains all the features of the first embodiment except the positions of SP layer 10 and OL 11 are switched and STO 3 is replaced by STO 3a having a NM1/OL/NM3/SP/NM2 configuration. The polarity of the direct current bias also switches sign with respect to FIG. 3.

Figure 12:
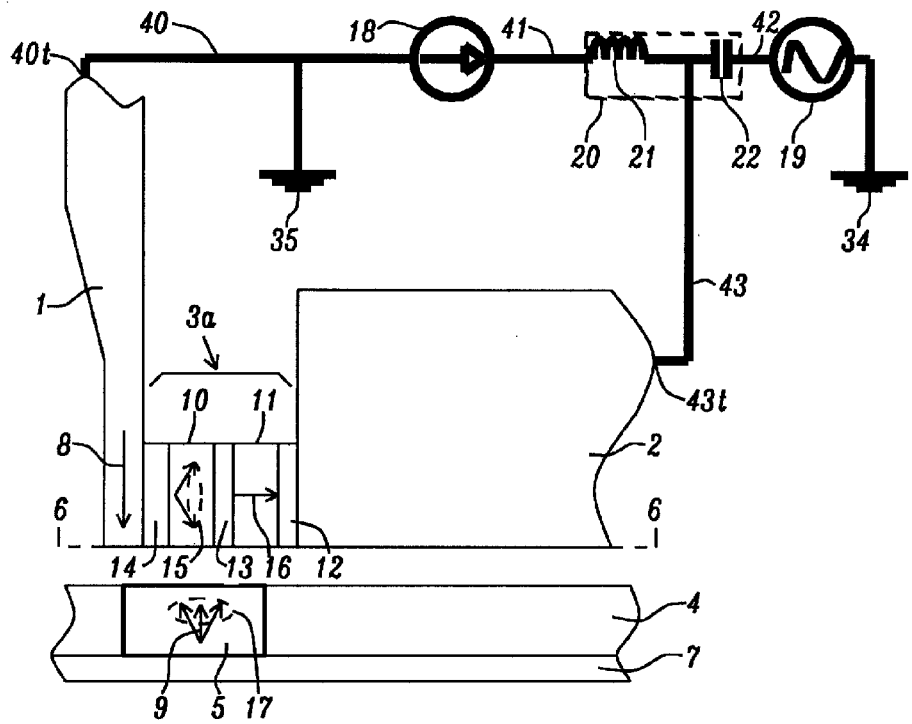
FIG. 12 is a cross-sectional view of a MAMR structure according to a sixth embodiment of the present disclosure wherein the positions of the OL and SP layer in the STO of the second embodiment (FIG. 8) are switched.

Referring to FIG. 12, a sixth embodiment is depicted with the same features as the second embodiment except STO 3 is replaced by STO 3a having a NM1/OL/NM3/SP/NM2 configuration wherein the positions of layers 10 and 11 are switched.

Figure 13:
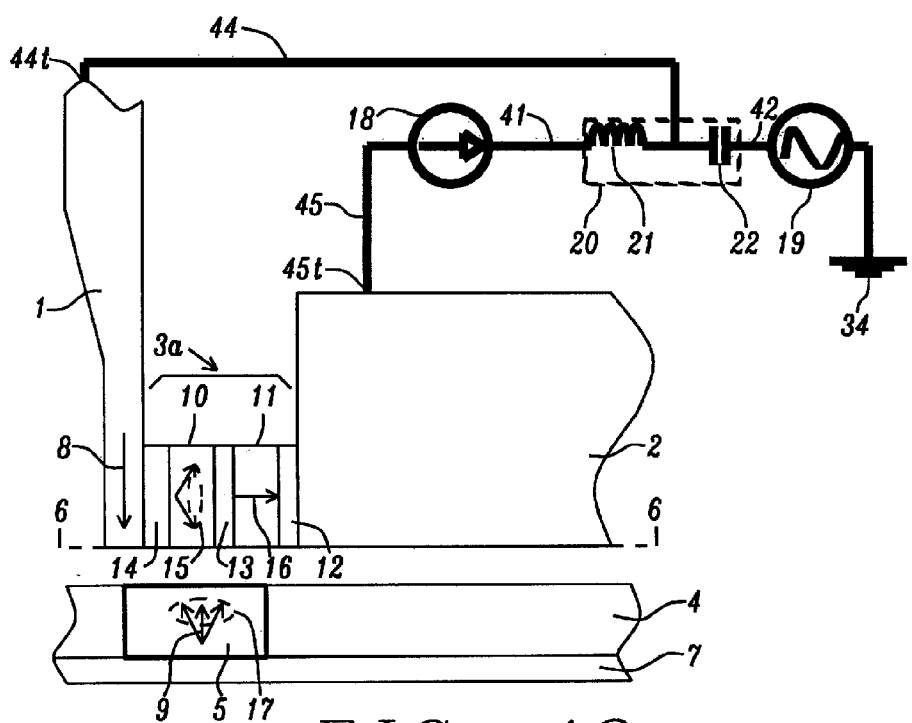
FIG. 13 is a cross-sectional view of a MAMR structure according to a seventh embodiment of the present disclosure wherein the positions of the OL and SP layer in the STO of the third embodiment (FIG. 9) are switched.

Referring to FIG. 13, a seventh embodiment is shown that is the same as the third embodiment except STO 3 is replaced by STO 3a with a NM1/OL/NM3/SP/NM2 configuration wherein the positions of layers 10 and 11 are switched.

Figure 14:
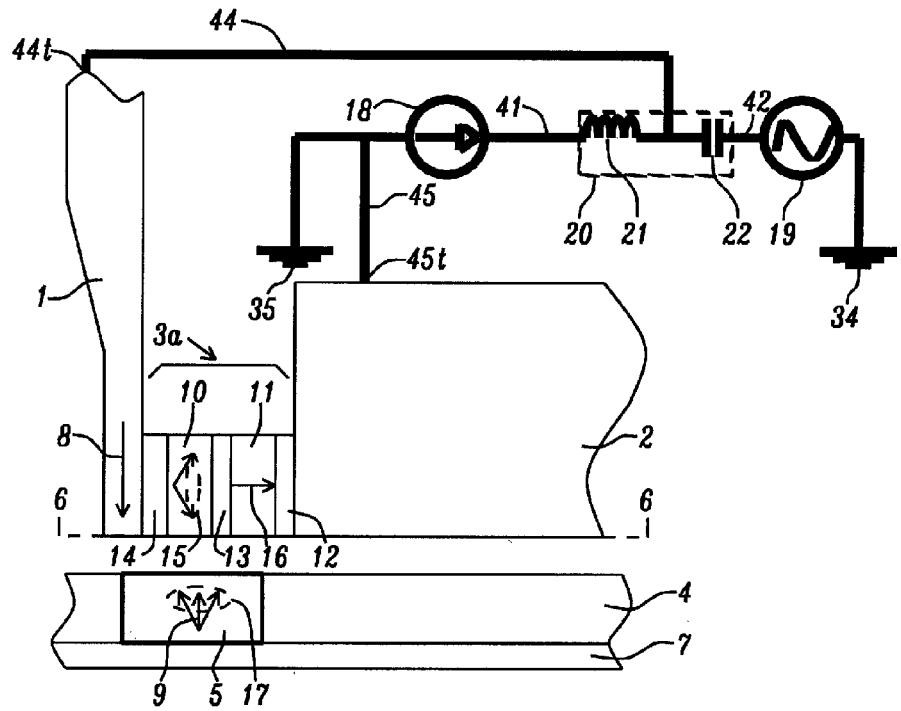
FIG. 14 is a cross-sectional view of a MAMR structure according to an eighth embodiment of the present disclosure wherein the positions of the OL and SP layer in the STO of the fourth embodiment (FIG. 10) are switched.

In FIG. 14, an eighth embodiment is depicted that is the same as the fourth embodiment except STO 3 is replaced by STO 3a with a NM1/OL/NM3/SP/NM2 configuration wherein the positions of layers 10 and 11 are switched.

Figure 15:
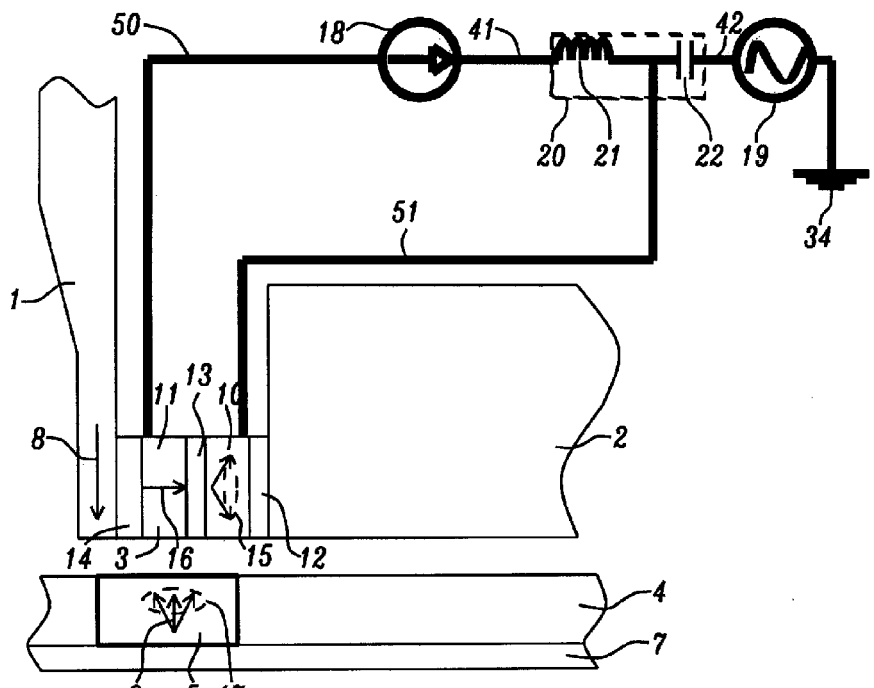
FIG. 15 is a cross-sectional view of a MAMR structure according to a ninth embodiment of the present disclosure wherein dc and rf current are injected directly into a STO.

With regard to FIG. 15, the present disclosure also anticipates that dc and rf current may be directly injected into the STO rather than first passing through a main pole terminal or a write shield terminal. In this embodiment, the NM1 layer 14 and NM3 layer 12 are preferably insulation layers made of an oxide. Furthermore, the SP layer 11 serves as a first terminal and is connected to the dc source 18 by a lead 50. OL layer 10 serves as a second terminal and is connected by a lead 51 to the bias T 20. Although the drawing depicts a current flow from layer 11 through the bias T to layer 10, there is an alternative embodiment where the dc and rf current flow is in the opposite direction. Furthermore, there could be a second ground added between the dc source 18 and one of the terminals (layer 10 or 11). The circuit design in this embodiment is more complicated to fabricate because of the extra processing involved in making the connection of leads 50, 51 to the STO structure. However, the benefits are expected to be similar to those realized in the prior eight embodiments.

The embodiments of the present invention provide an advantage over conventional MAMR designs in several aspects. First, the simultaneous application of dc and rf current from a bias T across a STO is able to lock the oscillation layer's oscillation frequency at a value that matches the resonance frequency of a medium bit during a write process thereby improving the writing assist process. Alternatively, the oscillation layer's large angle oscillation frequency can be tuned to a value that more closely matches the resonance frequency f0 of a medium bit by applying a rf current with frequency f=f0 across the STO. Thirdly, the simultaneous injection of dc current and rf current into a main pole terminal, a write shield terminal, or directly into the STO as disclosed herein is able to significantly reduce the critical current density that drives an oscillation layer into a large angle oscillation mode and thereby provides better STO reliability. All of the aforementioned benefits in the first eight embodiments are achieved without modification of the main pole, write shield, or STO structures. Instead, the circuit that connects to the main pole and write shield is upgraded to include a bias T with dc and rf terminals, and a rf generator is added to the MAMR structure.

While the present disclosure has been particularly shown and described with reference to, the preferred embodiment thereof, it will be understood by those skilled in the art that various changes in form and details may be made without departing from the spirit and scope of this disclosure.

We claim:

1. A microwave assisted magnetic recording (MAMR) structure that includes a write head, comprising:
    (a) a main pole that generates a magnetic flux field which is directed through a pole tip at an air bearing surface (ABS) and into a magnetic medium comprised of a plurality of bits, the magnetic flux has a gap field component that is directed across a spin torque oscillator (STO) and into a write shield;
    (b) the write shield with a side along the ABS that collects magnetic flux which has passed through the magnetic medium and written one or more bits;
    (c) the STO that is formed along the ABS and generates a rf field on the magnetic medium and thereby assists the writing to one or more bits; and
    (d) a bias tee (T) that is electrically connected by a lead to the main pole and by a lead to the write shield, and combines dc from a dc source and rf current from a rf current source and injects the dc and rf current combination into the STO to provide a dc bias, and a rf bias to the STO.

2. A microwave assisted magnetic recording (MAMR) structure that includes a write head, comprising:
    (a) a main pole that generates a magnetic flux field which is directed through a pole tip at an air bearing surface (ABS) and into a magnetic medium comprised of a plurality of bits, the magnetic flux has a gap field component that is directed across a spin torque oscillator (STO) and into a write shield;
    (b) the write shield with a side along the ABS that collects magnetic flux which has passed through the magnetic medium and written one or more bits;
    (c) the STO that is formed along the ABS and has a NM1/SP/NM3/OL/NM2 configuration wherein a first non-magnetic layer (NM1) adjoins the main pole, a second non-magnetic layer (NM2) contacts the write shield, SP is a layer with perpendicular magnetic anisotropy that spin polarizes direct current (dc) and radio frequency (rf) current passing there through, NM3 is a third non-magnetic layer between SP and OL layers, and OL is a layer with a magnetization that reaches a large angle oscillation state with an oscillation frequency when a threshold current with density ($j_c$) that is spin polarized by the SP layer exerts a spin transfer torque on the OL layer such that the large angle OL oscillation generates a rf field on the magnetic medium and assists the writing to one or more bits; and
    (d) a bias tee (T) that is electrically connected by a lead to the main pole and by a lead to the write shield, and combines dc from a dc source and rf current from a rf current source and injects the dc and rf current combination into the STO through a main pole terminal or a write shield terminal to provide a dc bias, and a rf bias to the STO.

3. The MAMR structure of claim 2 wherein the bias T has a dc terminal that is an inductor with impedance from about 0.1 to 10 milli-Henry.

4. The MAMR structure of claim 2 wherein the bias T has a rf terminal that is a capacitor with a capacitance from about 1 nanofarad to 500 nanofarad.

5. The MAMR structure of claim 2 wherein a terminal of the rf current source is connected to ground, and the leads to the main pole and write shield are electrically floating.

6. The MAMR structure of claim 2 wherein the lead to the main pole is connected to ground, a terminal of the rf current source is connected to ground, and the dc and rf current are injected by the bias T into the write shield terminal, the rf current has a frequency from about 0.1 to 50 GHz.

7. The MAMR structure of claim 2 wherein the lead to the write shield is connected to ground, a terminal of the if current source is connected to ground, and the dc and rf current are injected by the bias T into the main pole terminal.

8. The MAMR structure of claim 2 wherein a frequency and amplitude of the if current are tuned to reduce the threshold current density ($j_c$) and thereby provide better MAMR reliability and a higher device yield.

9. The MAMR structure of claim 2 wherein a frequency and amplitude of the rf current are tuned to lock the OL oscillation frequency of the large angle oscillation state to provide improved writing assist efficiency.

10. The MAMR structure of claim 2 wherein a frequency and amplitude of the rf current are tuned to pull and mix the OL oscillation frequency of the large angle oscillation state to provide improved writing assist efficiency.

11. The MAMR structure of claim 2 wherein a frequency and amplitude of the rf current are tuned to lock the OL oscillation frequency into a small angle in-plane precession state to prevent return field partial erasure of magnetic medium bits.

* * * * *